United States Patent
Mistry et al.

(10) Patent No.: US 10,778,601 B1
(45) Date of Patent: Sep. 15, 2020

(54) AUTOMATED ASSURANCE ANALYSIS PROVIDING FEEDBACK TO ORCHESTRATION OF RESOURCES IN VIRTUALIZATION INFRASTRUCTURE

(71) Applicant: EMC Corporation, Hopkinton, MA (US)

(72) Inventors: Nalinkumar Mistry, Ottawa (CA); Prasanna Patil, Scarsdale, NY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1517 days.

(21) Appl. No.: 14/581,224

(22) Filed: Dec. 23, 2014

(51) Int. Cl.
*H04L 12/917* (2013.01)

(52) U.S. Cl.
CPC .................... *H04L 47/76* (2013.01)

(58) Field of Classification Search
CPC ........................................ H04L 47/76
See application file for complete search history.

(56) References Cited

U.S. PATENT DOCUMENTS

| | | | |
|---|---|---|---|
| 6,459,682 B1 | 10/2002 | Ellesson et al. |
| 6,556,659 B1 | 4/2003 | Bowman-Amuah |
| 7,054,943 B1 | 5/2006 | Goldszmidt et al. |
| 7,269,157 B2 | 9/2007 | Klinker et al. |
| 7,356,602 B2 | 4/2008 | Goldszmidt et al. |
| 7,653,730 B1 | 1/2010 | Hoffman et al. |
| 7,937,453 B1 | 5/2011 | Hayden et al. |
| 8,190,850 B1 | 5/2012 | Davenport et al. |
| 8,291,411 B2 | 10/2012 | Beaty et al. |
| 8,452,928 B1 | 5/2013 | Ofer et al. |
| 2002/0083118 A1 | 6/2002 | Sim |
| 2002/0133491 A1 | 9/2002 | Sim et al. |
| 2003/0117954 A1 | 6/2003 | De Neve et al. |

(Continued)

OTHER PUBLICATIONS

European Telecommunications Standards Institute (ETSI), "Network Functions Virtualisation (NFV); Use Cases," ETSI GS NFV 001, V1.1.1, Oct. 2013, 50 pages.

(Continued)

*Primary Examiner* — Nicholas P Celani
(74) *Attorney, Agent, or Firm* — Ryan, Mason & Lewis, LLP

(57) ABSTRACT

At least one processing platform comprises virtualization infrastructure, an assurance module, an orchestration module, and an analytic engine coupled to the assurance module and the orchestration module. The assurance module is configured to monitor resources provided using the virtualization infrastructure under the control of the orchestration module. The analytic engine is configured to process monitoring results from the assurance module and to generate corresponding feedback to the orchestration module. The feedback to the orchestration module is utilized for at least one of adjusting one or more characteristics of the resources provided using the virtualization infrastructure, and performing one or more orchestration operations relating to the resources provided using the virtualization infrastructure. A topology module may be coupled to the analytic engine and configured to generate topology information relating to the resources. The topology information is utilized by the analytic engine in generating the feedback to the orchestration module.

20 Claims, 6 Drawing Sheets

(56) References Cited

U.S. PATENT DOCUMENTS

| | | | |
|---|---|---|---|
| 2006/0129687 A1* | 6/2006 | Goldszmidt | G06F 9/505 709/229 |
| 2012/0076052 A1 | 3/2012 | Kling et al. | |
| 2014/0010109 A1* | 1/2014 | Himura | H04L 41/12 370/254 |
| 2014/0101665 A1 | 4/2014 | Mousseau et al. | |
| 2014/0201374 A1 | 7/2014 | Ashwood-Smith et al. | |
| 2014/0241247 A1 | 8/2014 | Kempf et al. | |
| 2014/0298337 A1 | 10/2014 | Anderson et al. | |
| 2014/0301192 A1 | 10/2014 | Lee et al. | |
| 2014/0317261 A1 | 10/2014 | Shatzkamer et al. | |

OTHER PUBLICATIONS

European Telecommunications Standards Institute, "Network Functions Virtualisation," Introductory White Paper, presented at the SDN and OpenFlow World Congress, http://portal.etsi.org/NFV/NFV_White_Paper.pdf, Oct. 22-24, 2012, pp. 1-16, Issue 1, Darmstadt, Germany.

European Telecommunications Standards Institute, "Network Functions Virtualisation (NFV)," Update White Paper, presented at the SDN and OpenFlow World Congress, http://portal.etsi.org/NFV/NFV_White_Paper2.pdf, Oct. 15-17, 2013, pp. 1-16, Issue 1, Frankfurt, Germany.

A. Keller et al., "The WSLA Framework: Specifying and Monitoring Service Level Agreements for Web Services," Journal of Network and Systems Management, Mar. 2003, pp. 57-81, vol. 11, No. 1.

M. Mangili et al., "Stochastic Planning for Content Delivery: Unveiling the Benefits of Network Functions Virtualization," The 22nd IEEE International Conference on Network Protocols (ICNP), Oct. 2014, 6 pages.

M.K. Nichat et al., "Review on Modeling and Implementation of Cloud Computing," International Journal of Computer Science and Information Technologies (IJCSIT), Jan.-Feb. 2014, pp. 508-511, vol. 5, No. 1.

S. Aleksic et al., "Network Virtualization: Paving the Way to Carrier Clouds (invited)," 16th International Telecommunications Network Strategy and Planning Symposium (Networks), Sep. 2014, pp. 1-6, Funchal, Madeira Island, Portugal.

M. Chiosi et al., "Network Functions Virtualisation—An Introduction, Benefits, Enablers, Challenges & Call for Action," Introductory White Paper, SDN and OpenFlow World Congress, Oct. 2012, pp. 1-16, No. 1, Darmstadt, Germany.

Wikipedia, "Network Functions Virtualization," http://en.wikipedia.org/wiki/Network_Functions_Virtualization, Nov. 2014, 4 pages.

R. Jain, "OpenFlow, Software Defined Networking (SDN) and Network Function Virtualization (NFV)," Washington University in St. Louis, http://www.cse.wustl.edu/~jain/tutorials/icc14.htm, 2014, 93 pages.

* cited by examiner

AUTOMATED ASSURANCE ANALYSIS PROVIDING FEEDBACK TO ORCHESTRATION OF RESOURCES IN VIRTUALIZATION INFRASTRUCTURE

FIELD

The field relates generally to information processing systems, and more particularly to techniques for implementing assurance functionality in information processing systems comprising virtualization infrastructure.

BACKGROUND

Information processing systems increasingly utilize reconfigurable virtual resources to meet changing user needs in an efficient, flexible and cost-effective manner. For example, cloud computing and storage systems implemented using virtual resources have been widely adopted. More recently, network functions virtualization techniques have been proposed for use by telecommunication system and cable system service providers. Conventional aspects of such techniques are disclosed in European Telecommunications Standards Institute (ETSI), ETSI GS NFV 001, V1.1.1, "Network Functions Virtualisation (NFV): Use Cases," October 2013, which is incorporated by reference herein. See also the Introductory and Updated White Papers entitled "Network Functions Virtualisation," presented at the SDN and OpenFlow World Congress, Oct. 22-24, 2012 and Oct. 15-17, 2013, respectively, which are incorporated by reference herein. However, despite these and other recent advances in virtualization techniques, a need remains for further improvements, for example, with regard to implementation of assurance functionality.

SUMMARY

Illustrative embodiments of the present invention provide automated assurance analysis and corresponding feedback to orchestration of resources in network-based information processing systems comprising virtualization infrastructure.

In one embodiment, at least one processing platform comprises virtualization infrastructure, an assurance module, an orchestration module, and an analytic engine coupled to the assurance module and the orchestration module. The assurance module is configured to monitor resources provided using the virtualization infrastructure under the control of the orchestration module. The analytic engine is configured to process monitoring results from the assurance module and to generate corresponding feedback to the orchestration module. The feedback to the orchestration module is utilized for at least one of adjusting one or more characteristics of the resources provided using the virtualization infrastructure, and performing one or more orchestration operations relating to the resources provided using the virtualization infrastructure.

A topology module may be coupled to the analytic engine and configured to generate topology information relating to the resources provided using the virtualization infrastructure. For example, the topology module may be configured to collect, store or otherwise provide real-time updated topology information. The topology information is utilized by the analytic engine in generating the feedback to the orchestration module.

These and other illustrative embodiments described herein include, without limitation, methods, apparatus, systems, and articles of manufacture comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
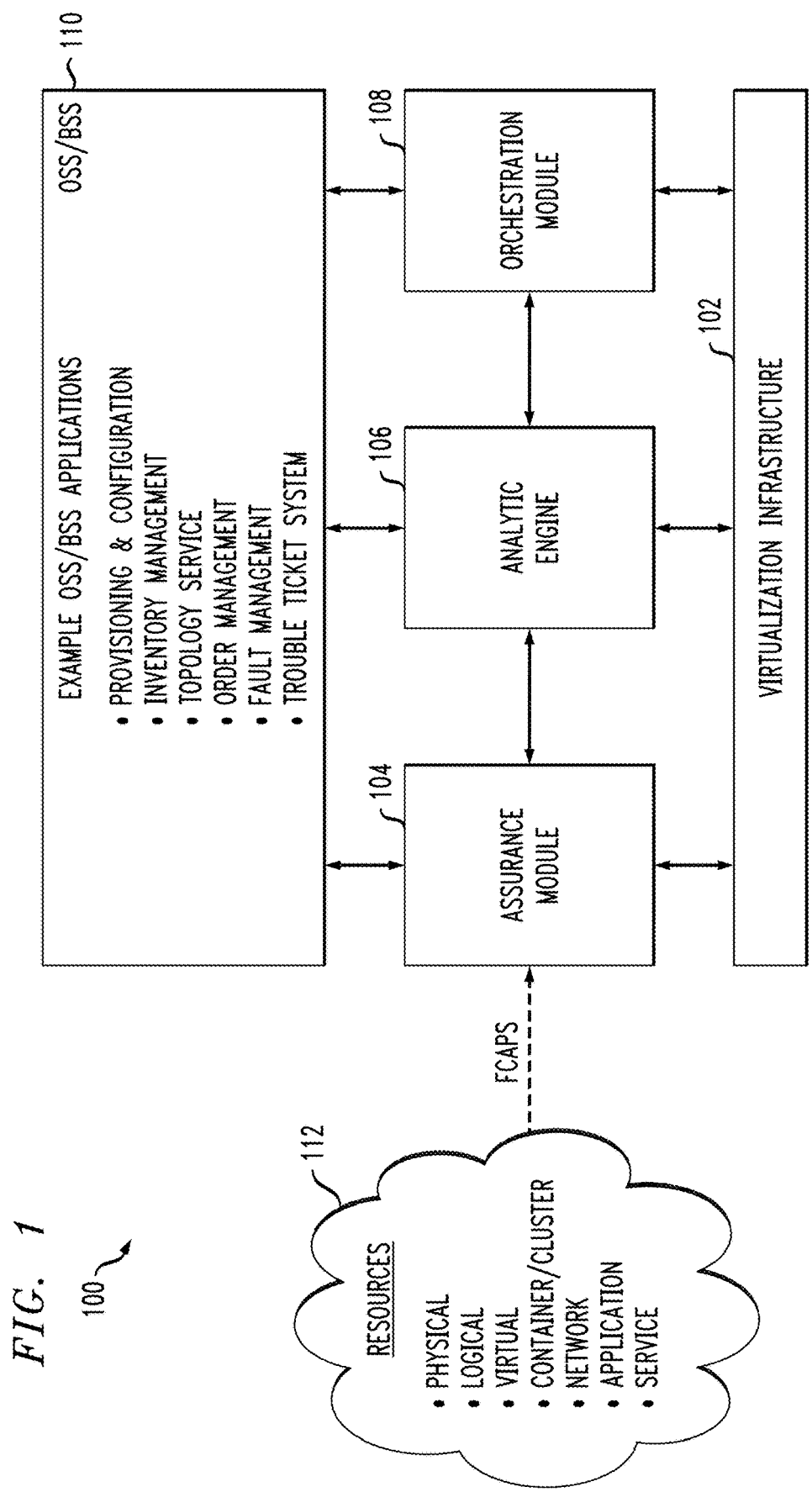
FIG. 1 is a block diagram of an information processing system implementing an analytic engine for automated assurance analysis and corresponding feedback to orchestration in an illustrative embodiment.

FIG. 1 shows an information processing system 100 configured in accordance with an illustrative embodiment of the present invention. The information processing system 100 comprises virtualization infrastructure 102, an assurance module 104, an analytic engine 106, and an orchestration module 108. The analytic engine 106 in this embodiment is coupled to the assurance module 104 and the orchestration module 108, and more particularly is arranged between the assurance module 104 and the orchestration module 108. Each of the modules 104, 106 and 108 is also coupled to the virtualization infrastructure 102.

The system 100 further comprises a support systems layer 110. The support systems layer 110 illustratively comprises an operations support system (OSS) and a business support system (BSS), both of which are configured to interact with each of the assurance module 104, the analytic engine 106 and the orchestration module 108. The layer 110 is therefore also referred to herein as an OSS/BSS layer 110.

Examples of applications provided by the OSS/BSS layer 110 in this embodiment include provisioning and configuration applications, inventory management applications, topology service applications, order management applications, fault management applications and trouble ticket system applications. These are examples only, and in other embodiments only a subset of these applications may be provided, or additional or alternative sets of applications typically associated with at least one of an OSS and a BSS may be provided. In addition, other support system layers in other embodiments may comprise only one of an OSS and a BSS, rather than both an OSS and a BSS as in the FIG. 1 embodiment.

The OSS/BSS layer 110 is generally associated with one or more service providers, with the OSS comprising applications that support back-office activities of the service providers such as provisioning, operation and maintenance of a service provider network and associated network services, and the BSS comprising applications that support customer-facing activities of the service providers such as billing, order management, customer relationship management, and call center automation.

It is to be appreciated, however, that embodiments of the invention are not limited to use in conjunction with service provider environments. For example, information processing systems of the type described herein can be adapted for implementation in enterprise environments as well as other types of information technology environments.

The assurance module 104 is configured to monitor resources 112 provided using the virtualization infrastructure 102 under the control of the orchestration module 108. The resources 112 provided using the virtualization infrastructure 102 in this embodiment illustratively include physical, logical, virtual, container, cluster, network, application and service resources. The container and cluster resources are collectively referred to herein as container/cluster resources. Again, these particular resources 112 are only examples, and other embodiments may involve only a subset of these resources, or additional or alternative sets of resources, as appropriate for a given system implementation.

The resources 112 may be viewed as examples of what are also referred to herein as "provisioned resources." Such resources may be provisioned for use in conjunction with orchestration operations by the above-noted provisioning and configuration application of the OSS/BSS layer 110.

The monitoring of the resources 112 by the assurance module 104 illustratively includes monitoring in accordance with the ISO-OSI FCAPS network management model, where FCAPS denotes fault, configuration, accounting, performance and security. Other types of monitoring models may be used in addition to or in place of the FCAPS model, including the FAB model, where FAB denotes fulfillment, assurance and billing. The monitoring in other embodiments need not be in accordance with any particular model or models, but could instead involve other types of resource monitoring. Also, different types of monitoring could be applied by the assurance module 104 for different types of resources. The term "monitoring" as used herein is therefore intended to be broadly construed.

The analytic engine 106 is configured to process monitoring results from the assurance module 104 and to generate corresponding feedback to the orchestration module 108. This feedback generated by the analytic engine can be used, for example, to adjust one or more characteristics of the resources 112 provided using the virtualization infrastructure 102, and additionally or alternatively to perform one or more orchestration operations relating to the resources 112 provided using the virtualization infrastructure 102. By way of example, the feedback can be used to adjust one or more service level agreement (SLA) characteristics of the resources 112. The feedback provided to the orchestration module 108 by the analytic engine 106 can be used in other ways in other embodiments.

The virtualization infrastructure 102 in some embodiments comprises network functions virtualization (NFV) infrastructure and the resources 112 provided using the virtualization infrastructure comprise one or more virtual network functions (VNFs) of the NFV infrastructure. Such VNFs illustratively comprise one or more applications with each application implemented utilizing at least one of a virtual machine running on the NFV infrastructure and a container running on the NFV infrastructure. These VNF applications are illustratively part of the application resources of resources 112.

The modules 104, 106 and 108 and other components of the system 100 illustratively communicate with one another over one or more operator networks or other service provider networks. At least parts of one or more of such service provider networks, or other networks utilized in other embodiments, may illustratively comprise, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

At least portions of the information processing system 100 are implemented using one or more processing platforms, examples of which will be described in greater detail below in conjunction with FIGS. 6 and 7. A given such processing platform comprises at least one processing device comprising a processor coupled to a memory, and the processing device may be implemented at least in part utilizing one or more virtual machines, containers or other virtualization infrastructure.

A given processing platform utilized to implement at least a portion of the information processing system 100 illustratively comprises one or more storage systems such as VNX® and Symmetrix VMAX®, both commercially available from EMC Corporation of Hopkinton, Mass. Other types of storage elements can be used in implementing an information processing system or portions thereof, including scale-out network attached storage (NAS) clusters implemented, for example, using Isilon® storage platforms, such as storage platforms comprising Isilon® platform nodes and associated accelerators in the S-Series, X-Series and NL-Series product lines, also commercially available from EMC Corporation. A wide variety of other storage products can be used to implement at least portions of an information processing system as disclosed herein.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 206, and is described with reference to components of the system 100 but is more generally applicable to other systems comprising an assurance module, analytic engine and orchestration module arranged as disclosed herein.

In step 200, resources of virtualization infrastructure 102 are provisioned for use by the orchestration module 108. For example, a provisioning and configuration application of the OSS/BSS layer 110 may be operative to provision particular resources 112 of the virtualization infrastructure 102 for use by the orchestration module 108. Other techniques for provisioning resources of the virtualization infrastructure 102 for use in subsequent orchestration by the orchestration module 108 may be used.

In step 202, the orchestration module 108 controls orchestration of the provisioned resources 112 of the virtualization infrastructure 102. For example, the orchestration module 108 may combine or otherwise arrange particular ones of the resources 112 to provide a particular service to an end user within the system 100. Portions of the provisioned resources that are utilized by the orchestration module 108 to orchestrate services within the system 100 are also referred to herein as "orchestrated resources." The orchestrated resources may comprise all or only a subset of the provisioned resources 112. All such resources in the present embodiment, whether unprovisioned, provisioned or orchestrated, are assumed to be provided by the virtualization infrastructure 102.

The term "orchestration" as used herein is intended to be broadly construed so as to encompass such arrangements as well as alternative techniques for controlling initiation of services utilizing combinations or other arrangements of selected ones of a plurality of provisioned resources.

Also, the term "end user" may refer, for example, to respective human users of the system 100, such as customers of one or more telecommunication system or cable system service providers, although the term "end user" as utilized herein is intended to be more broadly construed so as to encompass numerous other arrangements of human, hardware, software or firmware entities, as well as combinations of such entities.

In step 204, the assurance module 104 monitors the orchestrated resources provided using the virtualization infrastructure 102. This illustratively involves monitoring characteristics of at least a portion of the resources 112 in accordance with the FCAPS network management model, although as indicated previously other models or various types of custom monitoring of particular resources may be used. Results of this monitoring are provided by the assurance module to the analytic engine 106.

In step 206, the analytic engine 106 processes the results of the monitoring by the assurance module 104 to generate corresponding feedback to the orchestration module 108. This feedback generated by the analytic engine 106 is used, for example, to adjust one or more SLA characteristics or other characteristics of the resources 112 provided using the virtualization infrastructure 102, and additionally or alternatively to perform one or more orchestration operations relating to the resources 112. Again, the feedback provided to the orchestration module 108 by the analytic engine 106 can be used in other ways in other embodiments. Moreover, the particular resources 112 adjusted or subject to orchestration operations based at least in part on the feedback from the analytic engine 106 are not limited to orchestrated resources.

By way of example, the analytic engine 106 in some embodiments is configured to generate the feedback to the orchestration module 108 responsive to monitoring results indicative of at least one of an availability failure in a specified resource and a performance failure in a specified resource. Numerous other types of monitoring results may be processed by the analytic engine 106 in generating the feedback to the orchestration module 108.

As another example, the analytic engine 106 in some embodiments is configured to generate the feedback to the orchestration module 108 at least in part in the form of information specifying one or more corrective actions to be taken by the orchestration module 108 to recover from at least one SLA violation.

Such corrective actions may relate, for example, to SLA violations that are due to availability failures in physical resources such as compute, storage or network resources, availability failures in a virtualization layer that overlies the physical resources, and performance failures such as degradation in available network bandwidth or in available processor or memory resources on a virtual machine or other compute node.

It should be noted, however, that the feedback is not limited to specifying corrective actions to be taken by the orchestration module 108. For example, the feedback can be used by the orchestration module 108 solely for orchestration of new services, instead of correcting or otherwise adjusting previously-orchestrated services.

In the present embodiment, the analytic engine 106 may be configured to determine actual resource state relative to a desired resource state and to generate the feedback to the orchestration module 108 such that the actual resource state is automatically driven toward the desired resource state by the orchestration module 108. The system 100 in such an arrangement illustratively implements a feedback path from resources 112 to orchestration module 108 involving automated assurance analysis provided by analytic engine 106 based at least in part on monitoring results provided by assurance module 104.

Figure 2:
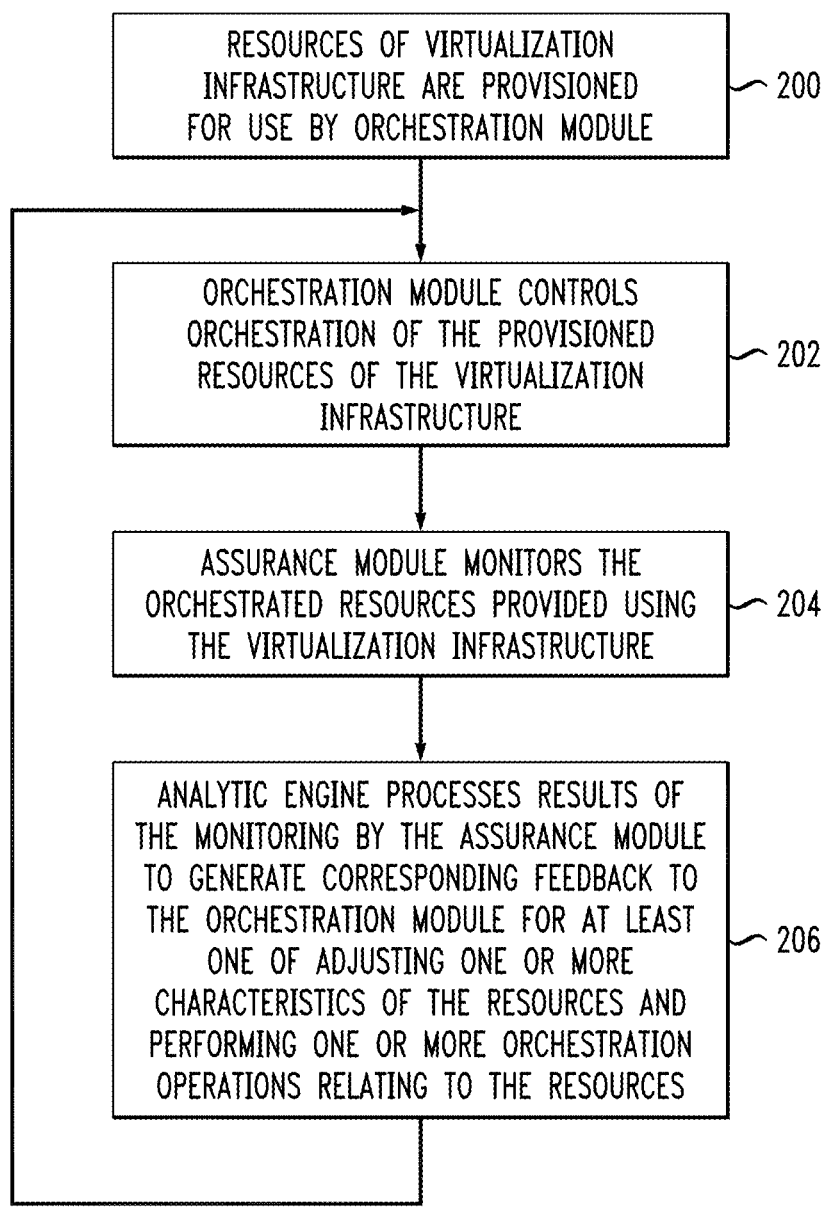
FIG. 2 is a flow diagram of an example process involving the analytic engine in the information processing system of FIG. 1.

From step 206, the FIG. 2 process flow illustratively returns to step 202 for performance of additional orchestration relating to provisioned resources. These can include previously-orchestrated resources as well as other provisioned resources that have not previously been orchestrated. Other types of flows between particular process steps can be included in other embodiments.

The particular processing operations and other system functionality described in conjunction with the flow diagram of FIG. 2 are presented by way of illustrative example only, and should not be construed as limiting the scope of the invention in any way. Alternative embodiments can use other types of processing operations involving automated assurance analysis and corresponding feedback to orchestration in an information processing system. For example, the ordering of the process steps may be varied in other embodiments, or certain steps may be performed concurrently with one another rather than serially. Also, one or more of the process steps may be repeated periodically for different processing applications, or performed in parallel with one another.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

An illustrative embodiment including a topology module will now be described with reference to FIG. 3. In this embodiment, an information processing system 300 comprises an assurance module 304, a topology module 305, an analytic engine 306 and an orchestration module 308. The orchestration module 308 in this embodiment is more particularly implemented as a management and orchestration ("M & O") module, which is considered an example of what is more generally referred to herein as an "orchestration module." The modules 305, 306 and 308 are each coupled to an OSS/BSS layer 310.

Figure 3:
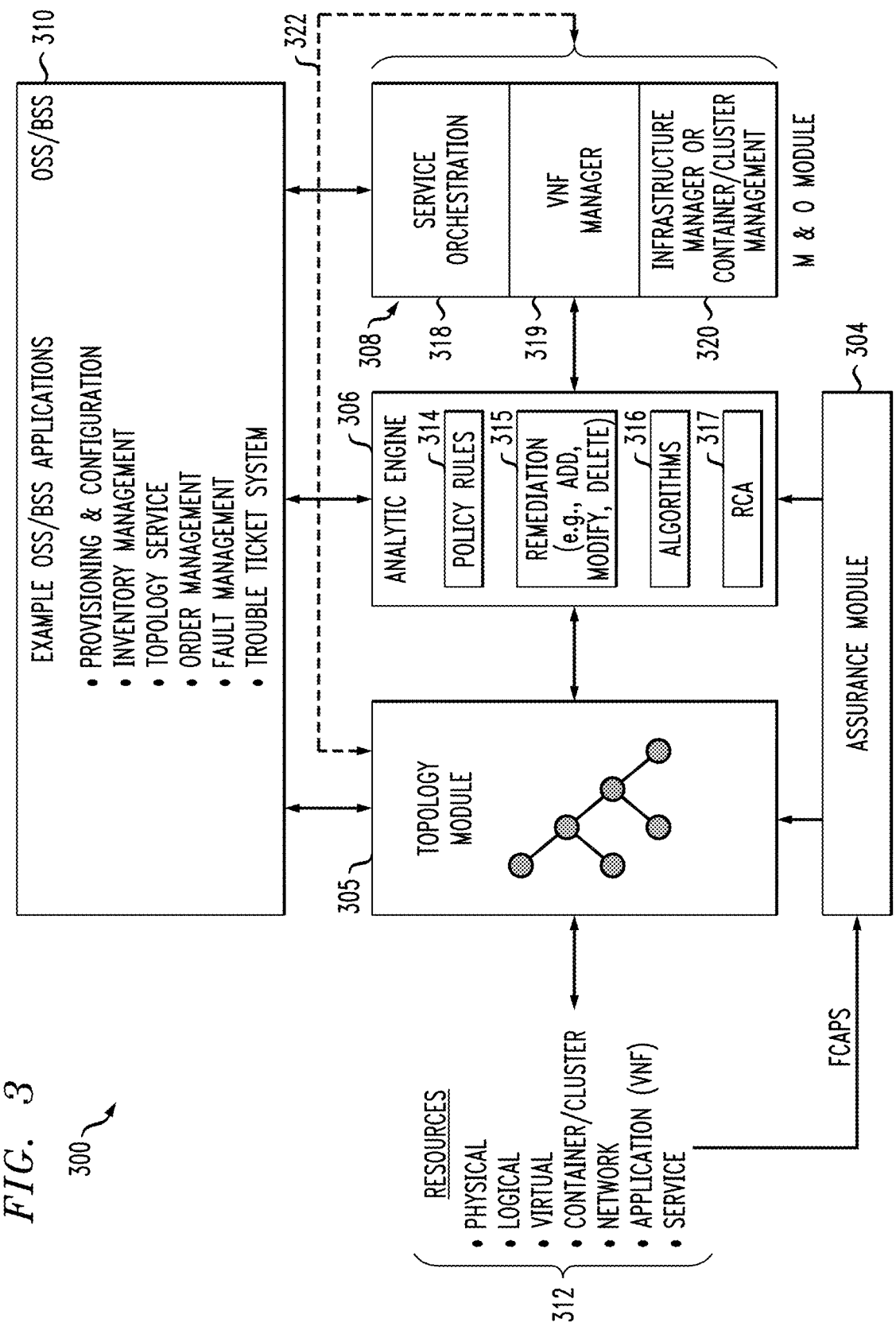
FIG. 3 is a block diagram of an information processing system implementing an analytic engine for automated assurance analysis and corresponding feedback to orchestration in another illustrative embodiment.

The system 300 is assumed to include virtualization infrastructure similar to that previously described in the context of system 100, but such virtualization infrastructure is not explicitly shown in FIG. 3. The virtualization infrastructure in the FIG. 3 embodiment is further assumed to comprise NFV infrastructure.

The assurance module 304 is coupled to both the topology module 305 and the analytic engine 306. The assurance module 304 is configured to monitor resources 312 that illustratively include physical, logical, virtual, container/cluster, network, application and service resources. The application resources in this embodiment are assumed to more particularly comprise VNF resources implemented as respective VNF applications as described previously, each utilizing at least one of a virtual machine running on the NFV infrastructure and a container running on the NFV infrastructure. These VNF applications are illustratively part of the application resources of resources 312.

The topology module 305 is configured to generate topology information relating to the resources 312 provided using the virtualization infrastructure. For example, the topology information may comprise a topological view of at least a portion of the resources 312. The topology module 305 is coupled between the assurance module 304 and the analytic engine 306 and can generate topology information through interaction with the resources 312. Additionally or alternatively, such topology information can be generated at least in part utilizing information provided by the assurance module 304. The topology information generated by the topology module 305 is illustratively utilized by the analytic engine 306 in generating feedback to the orchestration module 308.

In some embodiments, the topology module 305 is configured to collect, store or otherwise provide real-time updated topology information. These and similar operations are assumed to be encompassed by references to "generation" of topology information as that term is broadly utilized herein. Numerous other techniques for generation of topology information may be implemented in other embodiments.

The topology information in the FIG. 3 embodiment may comprise, for example, metadata characterizing relationships between different resource types. The different resource types may comprise the individual resource types listed in the figure, as well as various combinations or subsets of these resources. For example, certain resources such as application resources and service resources may be grouped together for purposes of generating at least a portion of the topology information.

Also, each resource type may itself comprise multiple distinct resource categories. For example, resources falling with the physical resource type may include compute, network and storage resources. As another example, resources falling within the virtual resources category may include virtual machines, hypervisors and software-defined networks (SDNs).

At least portions of the metadata can be derived from one or more graph databases relating to all or a subset of the resources 312 where such graph databases are incorporated in, maintained by or otherwise accessible to the topology module 305. Numerous other types of topology information may be used in other embodiments.

At least portions of the topology information generated by the topology module 305 are illustratively configured to reflect an "in-life" view provided by the assurance module 304 based on its monitoring of the resources 312 in accordance with the FCAPS model and other possible monitoring models.

The topology module 305 is also accessible to the orchestration module 308 in this embodiment, such that the topology information can be utilized by the orchestration module 308 in performing one or more orchestration operations relating to the resources 312 provided using the virtualization infrastructure.

The topology module 305 can also be leveraged by other system components, such as provisioning and configuration, inventory management and other applications of the OSS/BSS layer 310.

The topology module 305 in the FIG. 3 embodiment provides centralized views of the topology of the resources 312 and advantageously avoids problems associated with conventional topology database arrangements in which multiple topology databases or portions thereof as well as different types of topology views associated with different types of resources are widely distributed over numerous distinct systems, devices and other components.

As illustrated in the figure, the analytic engine 306 in this embodiment more particularly comprises a policy engine 314 implementing one or more policy rules, a remediation module 315 implementing add, modify and delete functionality, one or more predictive algorithms 316, and a root cause analysis (RCA) module 317. At least a subset of the components 314, 315, 316 and 317 are utilized by the analytic engine 306 in generating the above-noted feedback to the orchestration module 308.

For example, the policy engine 314 is illustratively configured to control policies and associated policy rules relating to orchestration as well as customer characterization, SLA management, and other policy-driven analysis functions.

One or more of the components 314, 315, 316 and 317 of the analytic engine 306 can be utilized to determine actual resource state relative to a desired resource state and to generate the feedback to the orchestration module 308 such that the actual resource state is automatically driven toward the desired resource state by the orchestration module 308.

The analytic engine 306 in the present embodiment completes a feedback loop between the assurance module 304 and the orchestration module 308 that facilitates orchestration of the resources 312 provided by the virtualization infrastructure. It can be advantageously configured to provide fully automated assurance analysis of monitoring results provided by the assurance module 304. For example, it can utilize fault and performance monitoring results from the assurance module 304 in combination with the topology information from the topology module 305 to provide intelligent feedback to the orchestration module 308 identifying corrective actions to be taken by the orchestration module 308 in order to recover from SLA violations or other issues.

The orchestration module 308 of the information processing system 300 further comprises a number of distinct components, illustratively including in the present embodiment a service orchestration component 318, a VNF manager 319, and at least one of an infrastructure manager or a container/cluster management component, both collectively identified by reference numeral 320. At least a subset of these components can interact with the topology module 305, as indicated by dashed line 322. Numerous other arrangements of one or more components can be used to implement an orchestration module as that term is broadly used herein. For example, one possible alternative implementation of orchestration module 308 can include only a subset of the service orchestration component 318, the VNF manager 319 and the infrastructure manager and container/cluster manager component 320.

Figure 4:
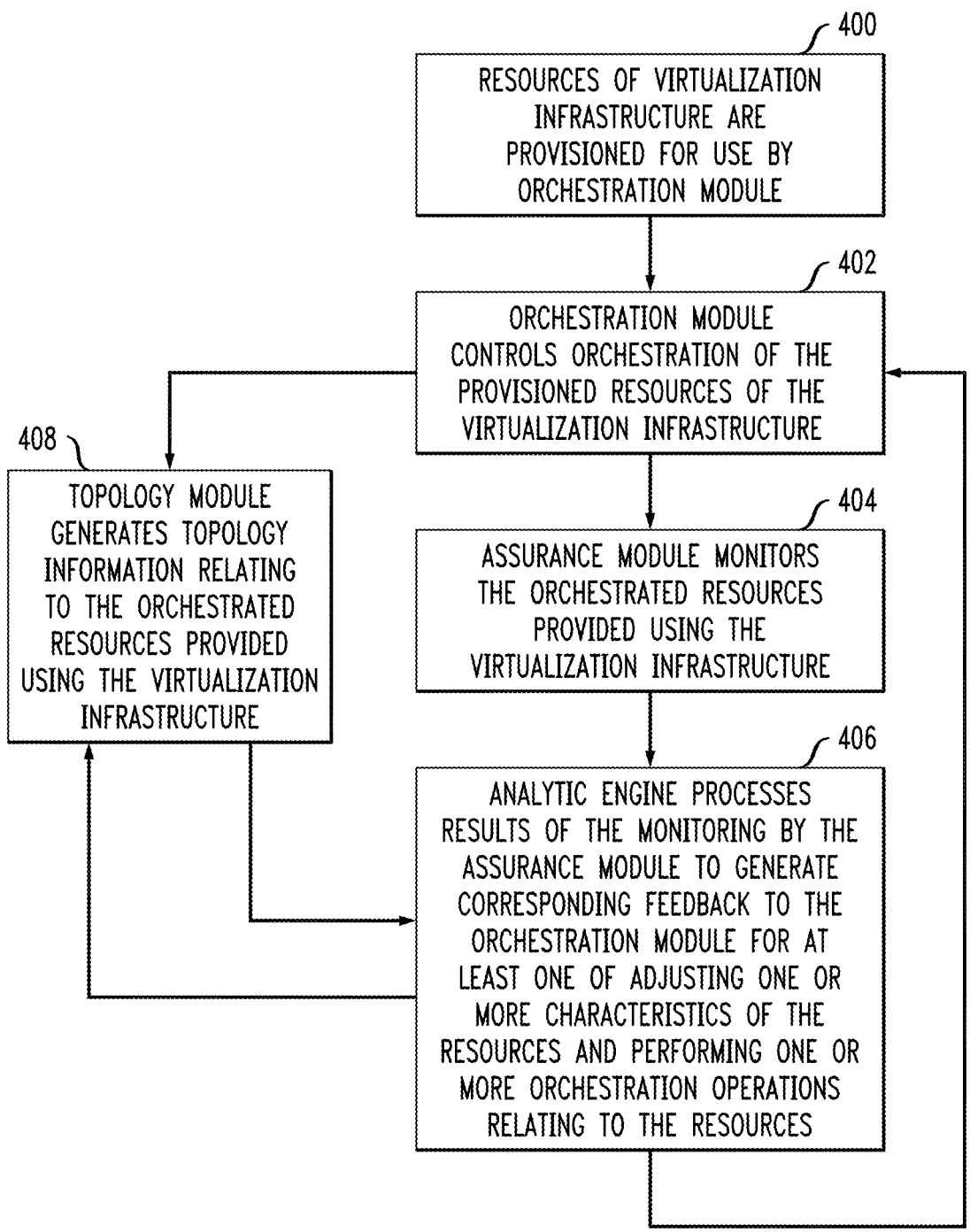
FIG. 4 is a flow diagram of an example process involving the analytic engine in the information processing system of FIG. 3.

The operation of the information processing system 300 is illustrated in the flow diagram of FIG. 4. The process as shown includes steps 400 through 406, which are substantially the same as respective steps 200 through 206 as previously described in conjunction with FIG. 2, but steps 400 through 406 are illustratively performed in this embodiment by the OSS/BSS layer 310, orchestration module 308, assurance module 304 and analytic engine 306, respectively. The FIG. 4 process further comprises an additional step 408, in which topology module 305 generates topology information relating to the orchestrated resources provided using the virtualization infrastructure. Step 408 in the flow diagram as illustrated can be entered from step 402 or step 406, and returns back to step 406. However, numerous alternative flows between the process steps are possible.

Like the FIG. 2 process, the FIG. 4 process is more generally applicable to other systems comprising an assurance module, analytic engine and orchestration module arranged as disclosed herein. Also, its particular processing operations and other system functionality are presented by way of illustrative example only, and should not be construed as limiting the scope of the invention in any way. Furthermore, functionality such as that described in conjunction with the flow diagram of FIG. 4 can be implemented at least in part in the form of one or more software programs stored in memory and executed by a processor of a processing device such as a computer or server. As mentioned previously, a memory or other storage device having executable program code of one or more software programs embodied therein is an example of what is more generally referred to herein as a "processor-readable storage medium."

Figure 5:
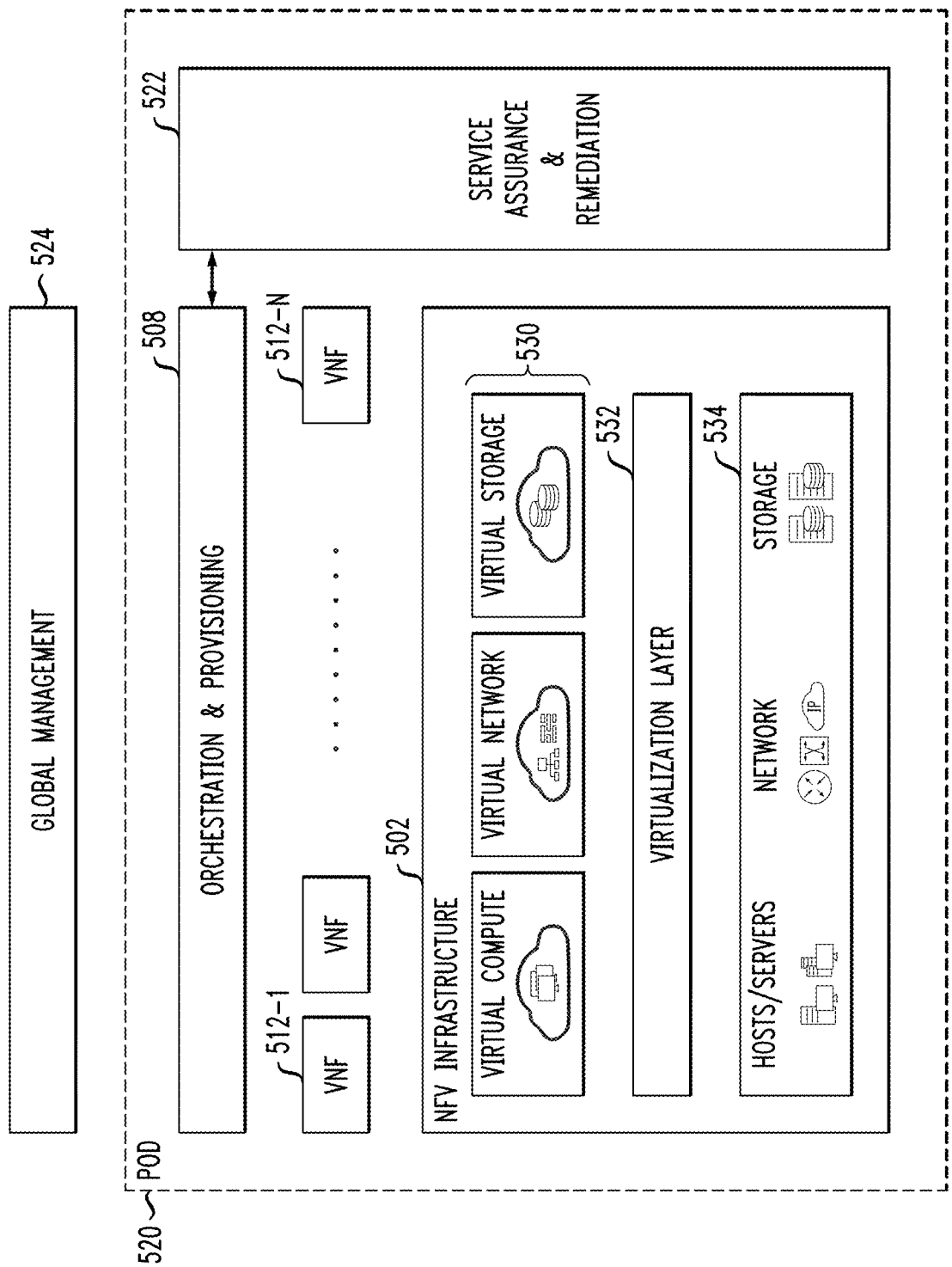
FIG. 5 is a block diagram of another illustrative embodiment of an information processing system incorporating functionality for automated assurance analysis and corresponding feedback to orchestration.

Referring now to FIG. 5, another illustrative embodiment is shown. In this embodiment, an information processing system 500 comprises NFV infrastructure 502 and an orchestration module 508 that is more particularly implemented as an orchestration and provisioning module, which is considered an example of what is more generally referred to herein as an "orchestration module." The orchestration module 508 orchestrates a plurality of resources provided by the NFV infrastructure 502. These include VNF resources that include VNF applications denoted as 512-1 through 512-N.

The NFV infrastructure 502 and the orchestration module 508 are part of a pod 520 that also includes a service assurance and remediation module 522. The module 522 is considered to comprise assurance and remediation components that are viewed as respective examples of what are more generally referred to herein as an assurance module and an analytic engine. Thus, the remediation component of the module 522 is assumed to comprise an analytic engine of the type previously described herein, configured to process monitoring results from the assurance component and to generate corresponding feedback for use by the orchestration module 508. Also associated with the pod 520 is an overlying global management layer 524 which can be configured to provide support system functionality similar to that provided by the OSS/BSS layers 110 and 310 of respective FIGS. 1 and 3.

The VNF applications 512-1 through 512-N are also referred to herein as respective VNF workloads of the NFV infrastructure 502, although other types of VNF workloads can be used in other embodiments. Each VNF application 512 can be implemented using one or more virtual machines of the NFV infrastructure 502 and additionally or alternatively one or more containers of the NFV infrastructure 502. These virtual machines or containers are part of virtual resources 530 of the NFV infrastructure 502 and illustratively include one or more virtual compute, network or storage resources. The virtual resources 530 are controlled by a virtualization layer 532 that runs on underlying hardware 534 which illustratively comprises physical hosts/servers, physical network resources and physical storage resources.

The NFV infrastructure 502 comprising virtual resources 530, virtualization layer 532 and hardware 534 may be collectively viewed as one example of what is more generally referred to herein as "virtualization infrastructure." At least portions of the VNF workloads may also be considered to be encompassed by the term "virtualization infrastructure" as that term is broadly used herein. Other types of virtualization infrastructure can be used in other embodiments, including the example processing platform of FIG. 6.

As noted above, the VNF workloads in this embodiment are assumed to comprise respective applications 512 running on one or more virtual machines of the virtualization infrastructure or inside containers of the virtualization infrastructure.

The VNF workloads are controlled at least in part by orchestration module 508 responsive to feedback from the service assurance and remediation module 522. Additional control functionality is provided by the global management layer 524.

The service assurance and remediation module 522 in this embodiment provides functionality at the pod level. In a given data center, there may be multiple pods 520, possibly geographically distributed, with each such pod incorporating functionality similar to that previously described in conjunction with the embodiments of FIGS. 1 and 3 but at a pod scale. The global management layer 524 manages these potentially geographically distributed pods, which may be connected by different types of networks, again using functionality similar to that previously described.

In the FIG. 5 embodiment, service provider customers or other end users of the system 500 leverage the orchestration module 508 to provision VNF workloads and the underlying infrastructure resources supporting those workloads. Once the VNF workloads are deployed, the assurance component of module 522 proactively monitors the provisioned resources to support the corresponding VNF services against a specified set of SLAs. If an SLA is violated, the assurance component notifies the remediation component comprising the analytic engine, which automatically generates feedback to the orchestration module to address the detected SLA violation.

As mentioned previously in the context of system 100, the particular arrangements of modules and other components of the systems 300 and 500 described herein are similarly considered illustrative examples only, and should not be construed as limiting in any way. Numerous alternative arrangements of modules and other components can be used in other embodiments.

It was noted above that portions of the information processing system 100 may be implemented using one or more processing platforms. Illustrative embodiments of such platforms will now be described in greater detail. Although described in the context of system 100, these platforms may also be used to implement at least portions of the information processing systems of FIGS. 3 and 5, as well as other information processing systems in other embodiments of the invention.

Figure 6:
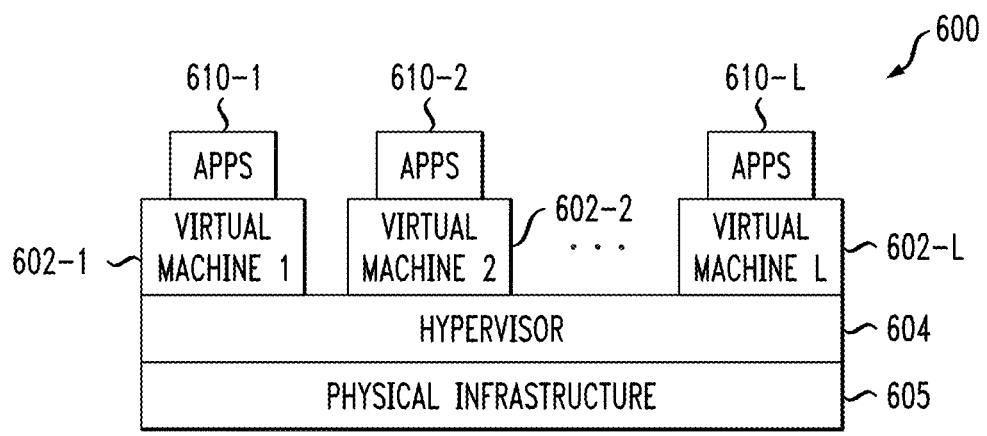
FIGS. 6 and 7 show examples of processing platforms that may be utilized to implement at least a portion of each of the systems of FIGS. 1, 3 and 5.
Figure 7:
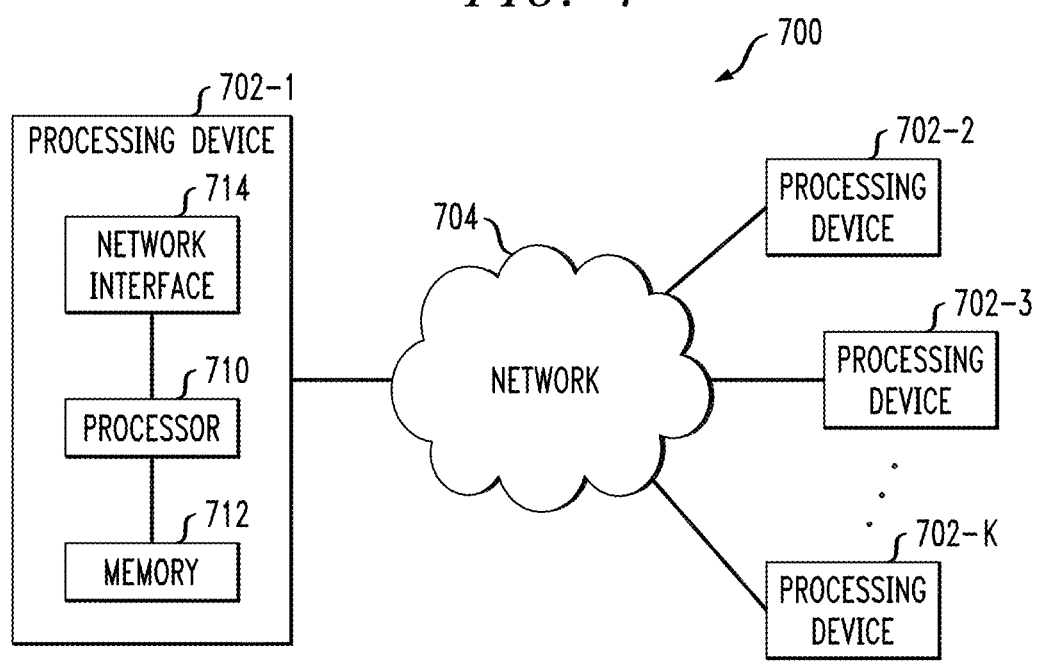

As shown in FIG. 6, portions of the information processing system 100 may comprise cloud infrastructure 600. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of a burst buffer appliance or other component of the system 100.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX® and Symmetrix VMAX®. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example an operator network or other service provider network. At least parts of these or other networks utilized in embodiments of the invention may comprise, for example, a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements. Such hardware elements in some embodiments may illustratively comprise commodity hardware elements utilized in a processing platform comprising virtualization infrastructure.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device such as one of the virtual machines 602 or one of the processing devices 702. For example, one or more of the assurance module 104, analytic engine 106 and orchestration module 108 in the FIG. 1 embodiment are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems, modules and components that can benefit from functionality for automated assurance analysis and corresponding feedback to orchestration of provisioned resources. Also, the particular configurations of system and device elements shown in FIGS. 1, 3 and 5-7 and the particular process operations of FIGS. 2 and 4 can be varied in other embodiments. Thus, for example, the particular types and arrangements of modules and other components deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least one processing platform comprising:
virtualization infrastructure; and
at least one processing device comprising a processor coupled to a memory;
wherein the at least one processing device is configured:
to orchestrate one or more virtual network functions to be provided using network functions virtualization of the virtualization infrastructure, a given one of the virtual network functions comprising one or more applications implemented utilizing at least one of a virtual machine running on the virtualization infrastructure and a container running on the virtualization infrastructure;
to generate topology information relating to the virtual network functions provided using the virtualization infrastructure, the topology information comprising metadata derived from one or more graph databases, the metadata characterizing relationships between different resource types utilized to orchestrate the virtual network functions, the different resource types comprising physical resources and virtual resources;
to monitor the orchestrated virtual network functions as provided using the virtualization infrastructure;
to process results of monitoring of the orchestrated virtual network functions utilizing the generated topology information to determine an actual state of the virtual network functions relative to a desired state of the virtual network functions and to generate corresponding feedback identifying one or more orchestration actions for automatically driving the actual state of the virtual network functions toward the desired state of the virtual network functions; and
responsive to the feedback, to perform the identified orchestration actions, the identified orchestration actions comprising at least one of:
(i) adjusting one or more characteristics of the virtual network functions provided using the virtualization infrastructure; and
(ii) performing one or more orchestration operations relating to the virtual network functions provided using the virtualization infrastructure; and
wherein the feedback further identifies one or more additional orchestration actions to be utilized in orchestrating one or more additional virtual network functions.

2. The apparatus of claim 1 wherein the virtualization infrastructure comprise one or more of physical, logical, virtual, container, cluster, network, application and service resources.

3. The apparatus of claim 1 wherein the at least one processing device is configured to generate the feedback responsive to monitoring results indicative of at least one of an availability failure in one or more specified physical and virtual resources implementing at least one of the virtual network functions and a performance failure in a specified one of the virtual network functions.

4. The apparatus of claim 1 wherein the at least one processing device is configured to generate the feedback at least in part in the form of information specifying one or more corrective actions to be taken to recover from at least one service level agreement violation.

5. The apparatus of claim 1 further comprising a support systems layer comprising at least one of an operations support system and a business support system.

6. The apparatus of claim 1 wherein the processing results of the monitoring comprises one or more of:
controlling policies and one or more associated policy rules relating to orchestration of the virtual network functions to be provided using the virtualization infrastructure; and
implementing add, modify and delete functionality for the orchestrated virtual network functions.

7. An information processing system comprising the apparatus of claim 1.

8. A method comprising:
orchestrating one or more virtual network functions to be provided using network functions virtualization of a virtualization infrastructure, a given one of the virtual network functions comprising one or more applications implemented utilizing at least one of a virtual machine running on the virtualization infrastructure and a container running on the virtualization infrastructure;
generating topology information relating to the virtual network functions provided using the virtualization infrastructure, the topology information comprising metadata derived from one or more graph databases, the metadata characterizing relationships between different resource types utilized to orchestrate the virtual network functions, the different resource types comprising physical resources and virtual resources;
monitoring the orchestrated virtual network functions as provided using the virtualization infrastructure;
processing results of the monitoring of the orchestrated virtual network functions utilizing the generated topology information to determine an actual state of the virtual network functions relative to a desired state of the virtual network functions and to generate corresponding feedback identifying one or more orchestration actions for automatically driving the actual state of the virtual network functions toward the desired state of the virtual network functions; and
responsive to the feedback, performing the identified orchestration actions, the identified orchestration actions comprising at least one of:
(i) adjusting one or more characteristics of the virtual network functions provided using the virtualization infrastructure; and
(ii) performing one or more orchestration operations relating to the virtual network functions provided using the virtualization infrastructure;
wherein the feedback further identifies one or more additional orchestration actions to be utilized in orchestrating one or more additional virtual network functions; and
wherein the method is implemented using at least one processing device comprising a processor coupled to a memory.

9. The method of claim 8 wherein processing results of the monitoring to generate corresponding feedback comprises generating the feedback responsive to monitoring results indicative of at least one of an availability failure in one or more specified physical and virtual resources implementing at least one of the virtual network functions and a performance failure in a specified one of the virtual network functions.

10. The method of claim 8 wherein processing results of the monitoring to generate corresponding feedback comprises generating information specifying one or more corrective actions to be taken to recover from at least one service level agreement violation.

11. An article of manufacture comprising a processor-readable storage medium having stored therein program code of one or more software programs, wherein the program code when executed by at least one processing device causes said processing device:
- to orchestrate one or more virtual network functions to be provided using network functions virtualization of a virtualization infrastructure, a given one of the virtual network functions comprising one or more applications implemented utilizing at least one of a virtual machine running on the virtualization infrastructure and a container running on the virtualization infrastructure;
- to generate topology information relating to the virtual network functions provided using the virtualization infrastructure, the topology information comprising metadata derived from one or more graph databases, the metadata characterizing relationships between different resource types utilized to orchestrate the virtual network functions, the different resource types comprising physical resources and virtual resources;
- to monitor the orchestrated virtual network functions as provided using the virtualization infrastructure;
- to process results of the monitoring of the orchestrated virtual network functions utilizing the generated topology information to determine an actual state of the virtual network functions relative to a desired state of the virtual network functions and to generate corresponding feedback identifying one or more orchestration actions for automatically driving the actual state of the virtual network functions toward the desired state of the virtual network functions; and
- responsive to the feedback, to perform the identified orchestration actions, the identified orchestration actions comprising at least one of:
  - (i) adjusting one or more characteristics of the virtual network functions provided using the virtualization infrastructure; and
  - (ii) performing one or more orchestration operations relating to the virtual network functions provided using the virtualization infrastructure;
- wherein the feedback further identifies one or more additional orchestration actions to be utilized in orchestrating one or more additional virtual network functions.

12. The apparatus of claim 1 wherein the generated topology information comprises a topological view of the at least a portion of the physical resources and the virtual resources utilized to orchestrate the virtual network functions.

13. The apparatus of claim 12 wherein the physical resources comprise compute, network and storage resources, and wherein the virtual resources comprise virtual machines, hypervisors and software-defined networks.

14. The apparatus of claim 1 wherein the generated topology information comprises a topological view of the virtual network functions based on monitoring the orchestrated virtual network functions in accordance with a monitoring model.

15. The apparatus of claim 14 wherein the monitoring model comprises at least one of: a fault, configuration, accounting, performance and security model; and a fulfillment, assurance and billing model.

16. The method of claim 8 wherein the generated topology information comprises a topological view of the virtual network functions based on monitoring the orchestrated virtual network functions in accordance with a monitoring model.

17. The method of claim 16 wherein the monitoring model comprises at least one of: a fault, configuration, accounting, performance and security model; and a fulfillment, assurance and billing model.

18. The article of manufacture of claim 11 wherein the generated topology information comprises a topological view of the virtual network functions based on monitoring the orchestrated virtual network functions in accordance with a monitoring model.

19. The article of manufacture of claim 18 wherein the monitoring model comprises at least one of: a fault, configuration, accounting, performance and security model; and a fulfillment, assurance and billing model.

20. The article of manufacture of claim 11 wherein the generated topology information comprises a topological view of the at least a portion of the physical resources and the virtual resources utilized to orchestrate the virtual network functions.

\* \* \* \* \*